(12) United States Patent
Castles et al.

(10) Patent No.: US 7,133,062 B2
(45) Date of Patent: Nov. 7, 2006

(54) GRAPHICAL USER INTERFACE FOR VIDEO FEED ON VIDEOCONFERENCE TERMINAL

(75) Inventors: Randy Castles, Austin, TX (US); Martin Sexton, Round Rock, TX (US); Alain Nimri, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 32 days.

(21) Appl. No.: 10/631,667

(22) Filed: Jul. 31, 2003

(65) Prior Publication Data

US 2005/0024485 A1    Feb. 3, 2005

(51) Int. Cl.
*H04N 7/14* (2006.01)

(52) U.S. Cl. .............................. 348/14.03; 348/14.08; 348/14.01

(58) Field of Classification Search .. 348/14.01–14.09, 348/14.1, 14.11, 14.12, 14.13; 345/753; 715/765, 810
See application file for complete search history.

(56) References Cited

U.S. PATENT DOCUMENTS

| | | | | |
|---|---|---|---|---|
| 5,583,984 | A * | 12/1996 | Conrad et al. .............. | 715/769 |
| 5,737,557 | A * | 4/1998 | Sullivan ..................... | 715/765 |
| 5,757,418 | A | 5/1998 | Inagaki | |
| 5,767,897 | A | 6/1998 | Howell ........................ | 348/15 |
| 5,848,356 | A | 12/1998 | Jambhekar et al. ......... | 455/403 |
| 5,889,852 | A * | 3/1999 | Rosecrans et al. ...... | 379/355.05 |
| 6,084,951 | A * | 7/2000 | Smith et al. ............. | 379/93.17 |
| 6,128,649 | A | 10/2000 | Smith et al. ................ | 709/217 |
| 6,137,485 | A | 10/2000 | Kawai | |
| 6,205,716 | B1 * | 3/2001 | Peltz .......................... | 52/36.2 |
| 6,346,962 | B1 | 2/2002 | Goodridge | |
| 6,442,263 | B1 | 8/2002 | Beaton et al. ......... | 379/142.04 |
| 6,580,458 | B1 | 6/2003 | Inagaki | |
| 6,680,746 | B1 * | 1/2004 | Kawai et al. ............ | 348/211.9 |
| 2002/0191071 | A1 | 12/2002 | Rui et al. ................ | 348/14.03 |
| 2003/0071902 | A1 | 4/2003 | Allen et al. ............. | 348/211.11 |
| 2003/0081110 | A1 | 5/2003 | Lemieux et al. ......... | 348/14.01 |

FOREIGN PATENT DOCUMENTS

| | | |
|---|---|---|
| EP | 589068 A1 * | 3/1994 |
| EP | 1148695 A2 * | 10/2001 |
| GB | 2 316 563 A | 2/1998 |
| WO | WO 01/59551 A2 | 8/2001 |
| WO | WO 01/67286 A2 | 9/2001 |
| WO | WO 01/82616 A1 | 11/2001 |
| WO | WO 03/032631 A1 | 4/2003 |

OTHER PUBLICATIONS

Ojala; Video Conference Equipment; May 7, 1998; WO 98/19458.*
Search Report received in corresponding European Application Serial 04018166.1-1247-; Nov. 8, 2004.

* cited by examiner

*Primary Examiner*—Melur Ramakrishnaiah
(74) *Attorney, Agent, or Firm*—Wong, Cabello, Lutsch, Rutherford & Brucculeri, LLP

(57) ABSTRACT

The Graphical User Interface (GUI) of a videoconference terminal is provided with user-selectable icons which are associated by the user with various video signals. Textual labels for the various video signals may also be provided. This information may be exchanged with the "far end" participant in the video conference. During the videoconference participants may then simply select an icon to dynamically switch video feeds without having to remember by number the particular camera or other video signal associated with a desired video feed.

21 Claims, 8 Drawing Sheets

GRAPHICAL USER INTERFACE FOR VIDEO FEED ON VIDEOCONFERENCE TERMINAL

BACKGROUND

1. Field of the Invention

This invention relates to videoconferencing systems. More particularly it relates to Graphical User Interfaces used to control the operation of a video conference terminal.

2. Description of the Related Art

Videoconferencing systems are relatively complex. They typically involve a plurality of video signals, audio signals, processors, apparatus and/or software for data compression and decompression, directional microphones, speakers, video display units, feedback-prevention circuits, cameras and connections to telecommunications networks with associated interface devices.

Systems and methods which alleviate the complexity of videoconferencing systems and simplify the user interface help to gain mass-market acceptance of videoconferencing as an alternative to in-person meetings which often involve travel to a remote location. As has been demonstrated in the personal computer industry, one particularly successful method of simplifying the user's interaction with the system is to employ a graphical user interface (GUI). Since videoconferencing systems are often processor-based systems having one or more video displays, a GUI is particularly suitable due to the fact that the major hardware components of a GUI are already in place.

Videoconferencing systems often have more than one camera or source of video signal associated with a videoconferencing terminal or station. The user may select the particular video signal to be displayed on his or her video monitor(s). In addition, the user may also be presented the option of controlling either the "near end" or "far end" video source—e.g., the pan and tilt of a camera generating video signals being sent by or to the user's terminal. Keeping track of which video signal is which is a task that increases the user's workload during a videoconference and detracts from the user's attention. The present invention simplifies the task of video source selection.

SUMMARY OF THE INVENTION

Various icons are selected by the user for display on the Graphical User Interface (GUI) of a videoconference terminal which icons represent different sources of video signal. The icons may be labeled with a textual label and may also be sent to the "far end" participant in the videoconference. By selecting a certain icon, the video source associated with that icon is automatically used as the video feed to the user's monitor. Icons may be selected from a catalog of previously-created icons which may be categorized by, for example, profession and/or industry segment.

DETAILED DESCRIPTION

Figure 1:
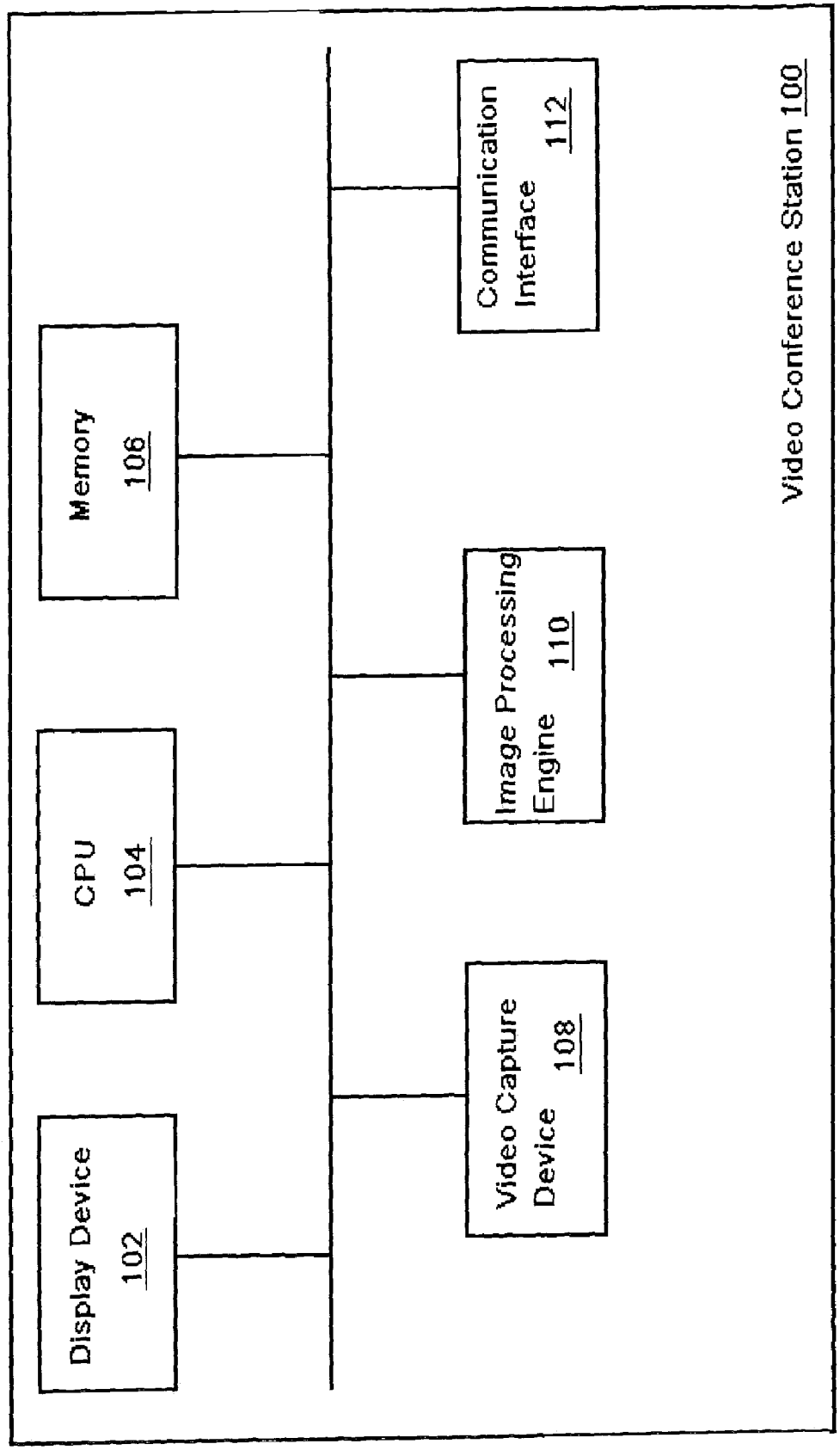
FIG. 1 is a block diagram of an exemplary video conference station for use in a videoconferencing system.

FIG. 1 is a block diagram of an exemplary video conference station 100. For simplicity, the video conference station 100 will be described as the local video conference station, although the remote video conference station may contain a similar configuration. In one embodiment, the video conference station 100 includes a display device 102, a CPU 104, a memory 106, at least one video capture device 108, an image processing engine 110, and a communication interface 112. Alternatively, other devices may be provided in the video conference station 100, or not all above-named devices provided. The at least one video capture device 108 may be implemented as a charge couple device (CCD) camera, a complementary metal oxide semiconductor (CMOS) camera, or any other type of image capture device. The at least one video capture device 108 captures images of a user, conference room, or other scenes, and sends the images to the image processing engine 110. Typically, the image processing engine 110 processes the video image into data packets before the communication interface 112 transmits the data packets to the remote video conference station. Conversely, the image processing engine 110 also transforms received data packets from the remote video conference station into a video signal for display on the display device 102.

Figure 2:
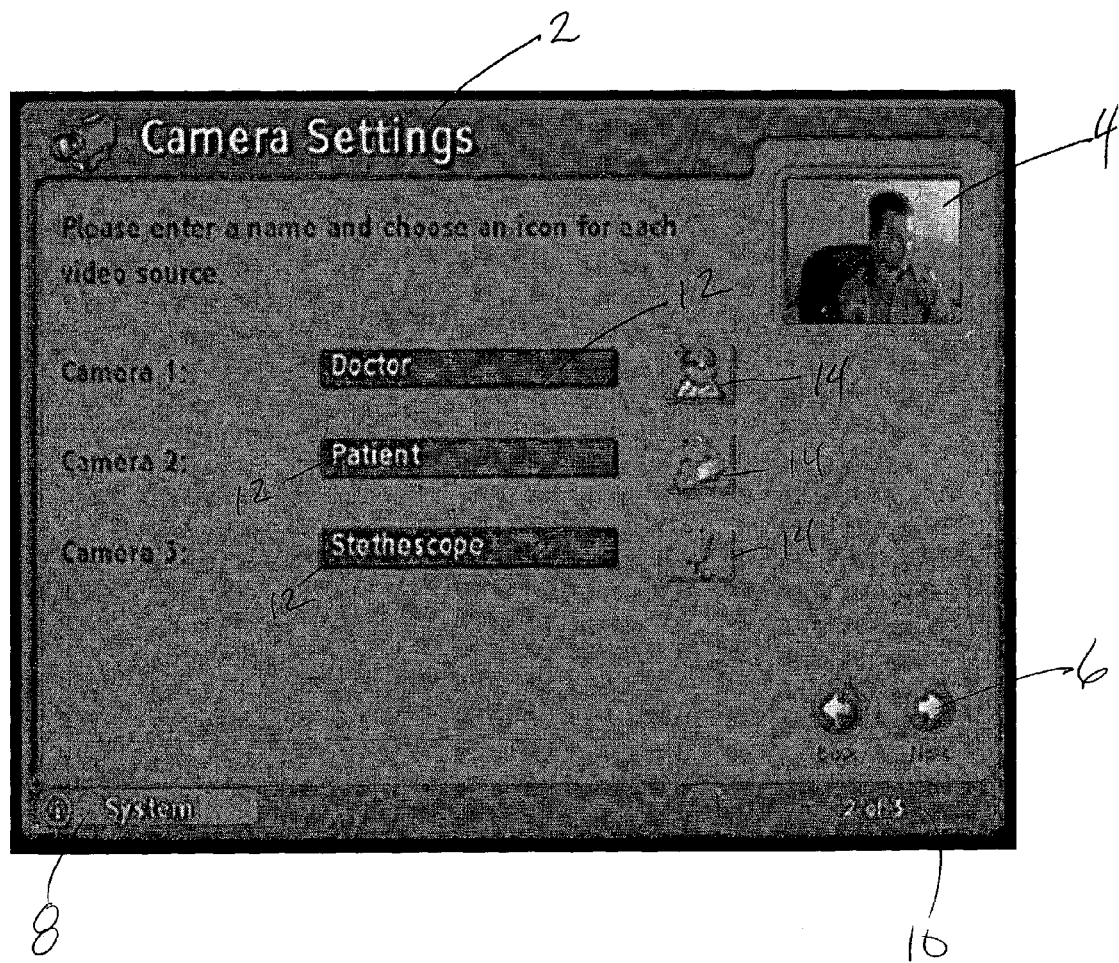
FIG. 2 is the camera settings page of a graphical user interface for a videoconferencing system.

Referring now to FIG. 2, there is shown the Camera Settings page for one particular embodiment of the invention. Screen identifier 2 informs the user of the purpose or function of the currently-displayed screen. The current video feed may be displayed in window 4. Navigation buttons 6 allow the user to move forward or backwards through the menu hierarchy. Selection may be made by any of the means known in the art—for example, pointing devices such as a mouse or trackball, keyboard cursor controls ("arrow keys") light pen, touch screen or handheld remote control.

System tab 8 may be used to access various administrative functions which, in certain embodiments, may be password-limited. Page identifier 10 informs the user that both previous and subsequent pages within the "Camera Settings" chapter are available via navigation buttons 6. For example, one page might contain general settings such as the brightness level of the far side video source while another page might contain a selection of high-resolution and motion-optimized cameras.

In the particular embodiment illustrated, there are three cameras or video signals which the user may alternatively select for either broadcast by the near end terminal or selection by the far end user. Associated with each camera or video feed is camera name field 12 which may be populated within character limits set by the system by alphanumeric characters entered from a keyboard, handheld remote, or similar device. Also associated with each camera or video feed is an icon 14.

In one particular embodiment, when the user selects any one icon 14 on the Camera Settings page illustrated in FIG. 2, a different Camera Settings page such as that illustrated in FIGS. 2 through 6, inclusive, is displayed. On these pages, a selection of icons may be displayed for the user's selection. Icons may be grouped by interest areas which may be listed on drop down menu 16. Selection of a certain interest area may cause the display to switch to an appropriate group of selectable icons.

Figure 3:
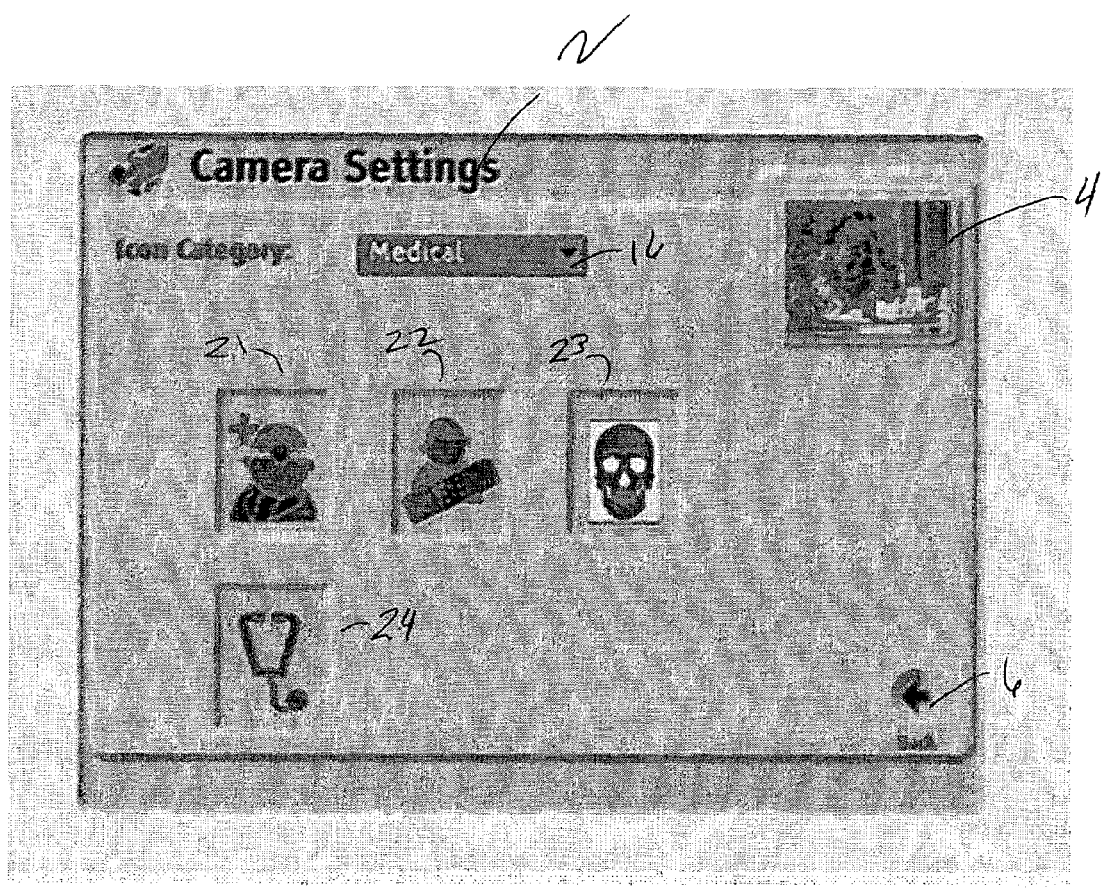
FIG. 3 is an icon selection page containing medical-related icons.

By way of example, FIG. 3 shows various icons that might be useful in a videoconference relating to a medical issue. Doctor icon 21 might be associated with a camera trained on the physician; patient icon 22 might provide an image of the patient who is the subject of the videoconference; X-ray icon 23 could be associated with an X-ray viewer; and, stethoscope icon 24 could be used to designate a video feed from a cardiac monitor or other medical instrument.

Figure 4:
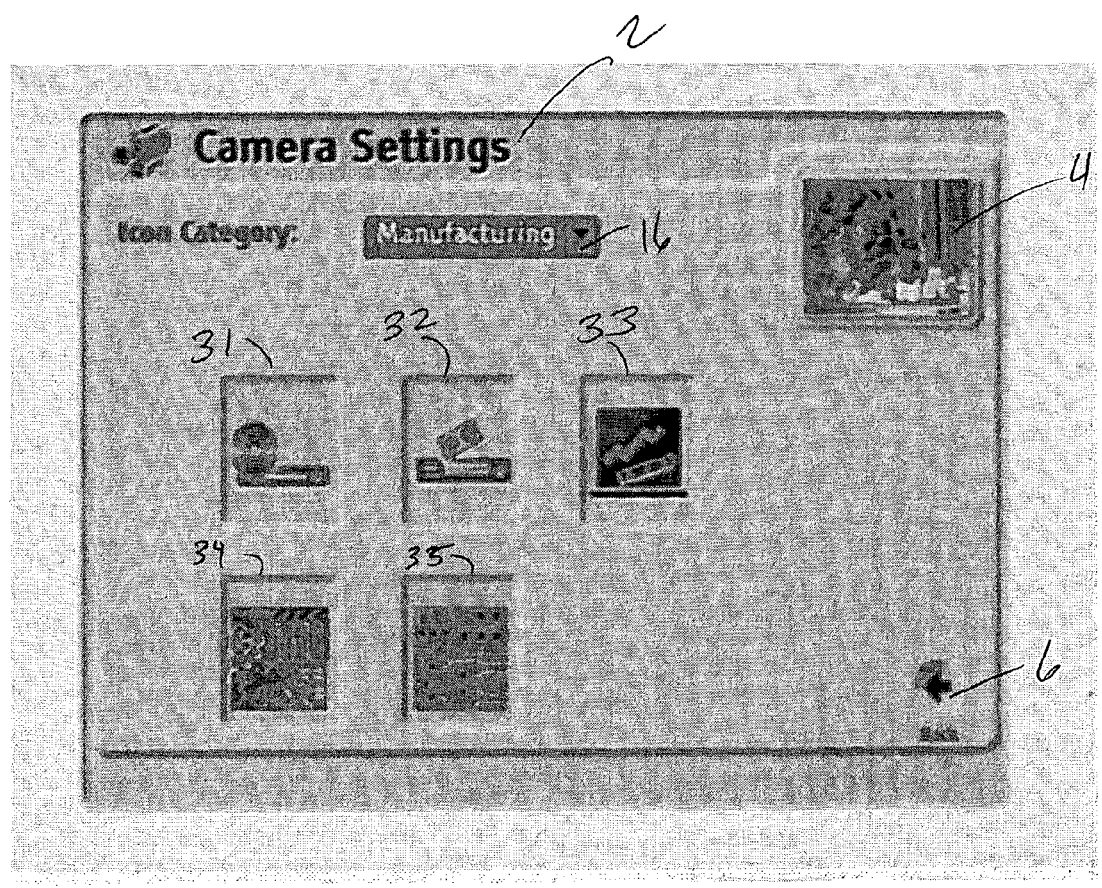
FIG. 4 is an icon selection page containing manufacturing-related icons.

Another example is shown in FIG. 4 where icons which might be relevant to a videoconference concerning a manufacturing process are shown. Icon 31 could be used to label a video feed from a DVD player; icon 32 could be used to label a video feed from a VCR; whiteboard icon 33 could be used for a camera trained on a whiteboard, or a video feed directly from a video-enabled, electronic whiteboard; factory icon 34 could be associated with a camera within a manufacturing facility; and, circuit board icon 35 could be associated with a camera focused on a particular product within a manufacturing facility.

Figure 5:
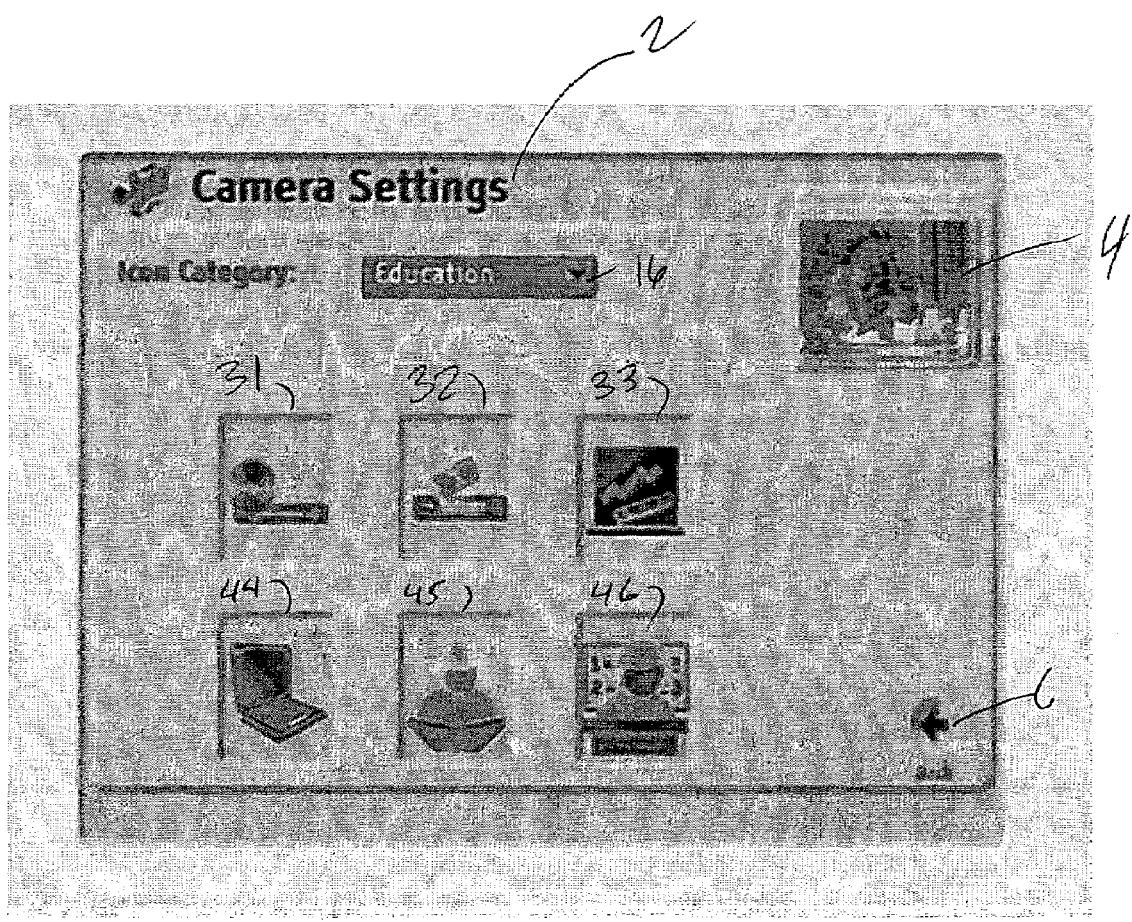
FIG. 5 is an icon selection page containing education-related icons.

In yet another example, a group of icons suitable for a videoconference involving an educational institution is shown in FIG. 5. Icon 44 might represent the video feed to a Computer-Based Training (CBT) terminal; student icon 45 might be associated with a camera directed to a student; teacher icon 46 could similarly be directed on the lecturer.

Figure 6:
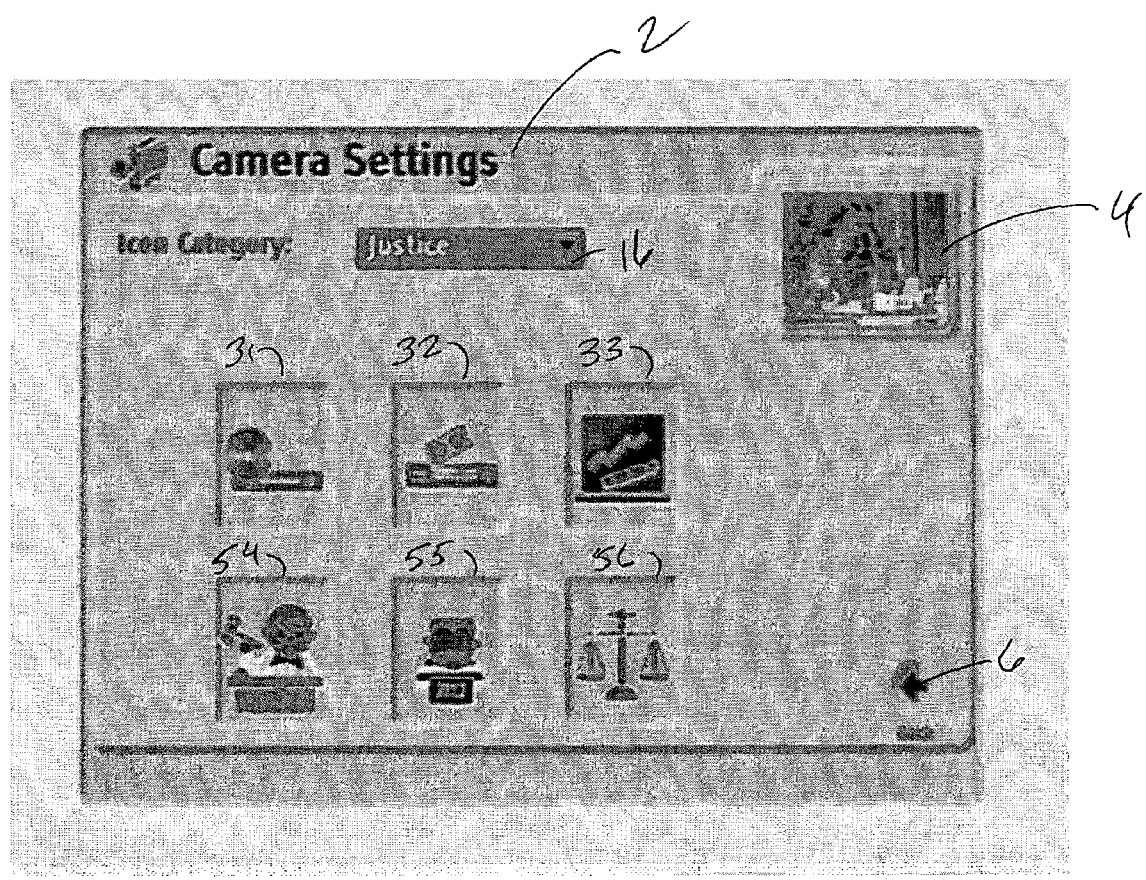
FIG. 6 is an icon selection page containing legal-related icons.

FIG. 6 shows a selection of icons that might be suitable for a videoconference of a legal proceeding. Icon 54 could be for a camera trained on the judge while icon 55 was for a camera trained on the attorney examining the witness. Scales-of-justice icon 56 might be associated with yet another location within a courtroom.

Figure 7:
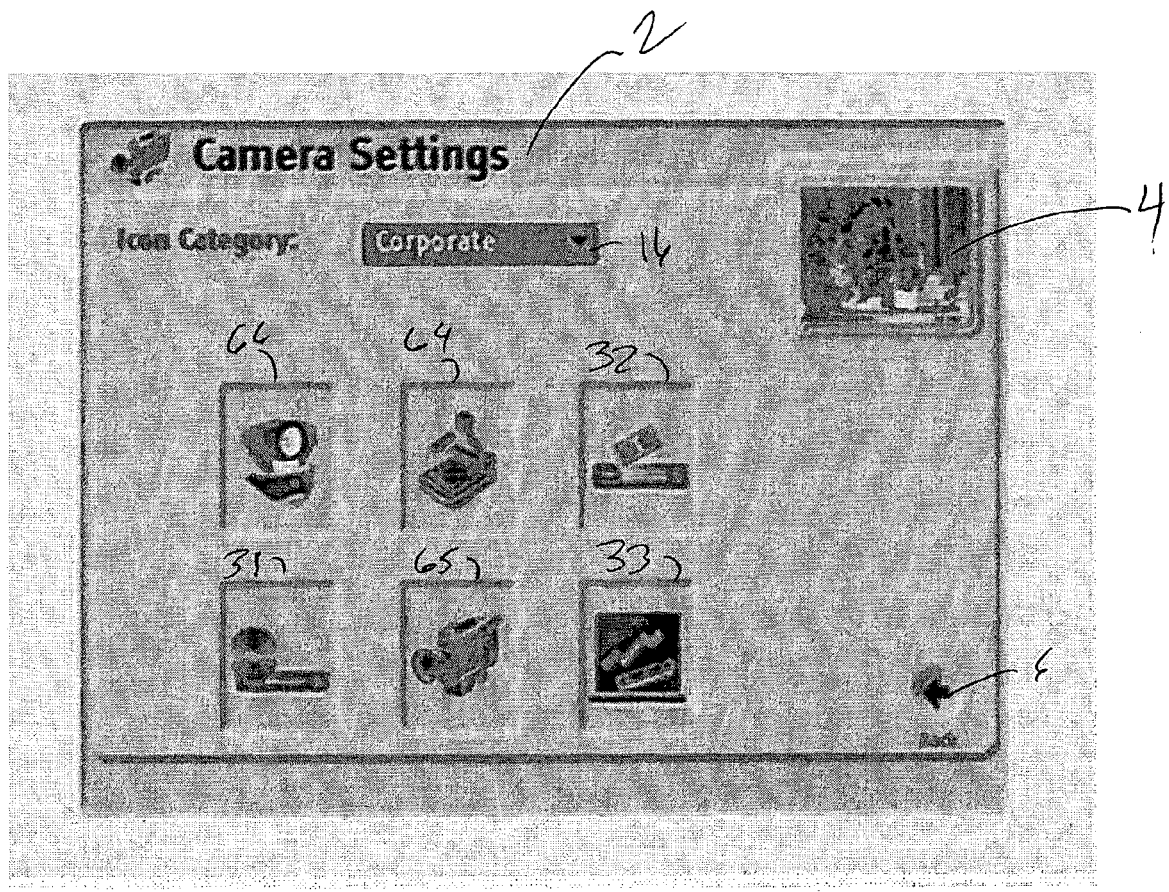
FIG. 7 is an icon selection page containing corporate or business-related icons.

Illustrated in FIG. 7 are a group of icons suitable for a generic videoconference in a corporate setting. Icon 64 might be associated with a document camera or an overhead projector; icon 65 could be the video feed from a portable video camera; and, icon 66 might be the video from the set-top box in the conference room.

In the embodiment illustrated in FIGS. 2 through 6, selecting the "back" navigation button 6 returns the user to the Camera Settings page illustrated in FIG. 2 where the process of labeling and associating icons with various cameras and/or video feeds may be continued.

Once the various camera or video feeds have been labeled and assigned an icon, the icons may be exchanged with the far end terminal. In this way, each participant in the videoconference has knowledge of the various video signals he or she may select for display on the local video display device.

Default camera or video signal names may, in some embodiments, be initially displayed on the camera settings page. By way of example only, the default names might be: "Main"; "Document"; "VCR"; and, "Aux". In a similar fashion, default icons may be associated with these default names such as base unit camera icon 66, document camera icon 64 and VCR icon 32.

In certain embodiments, labels displayed on the screen (including the names of the various icon categories), may be automatically translated into the language selected by the user. In still other embodiments, language selection may be inferred from the particular country code used in dialing the videoconference.

Figure 8:
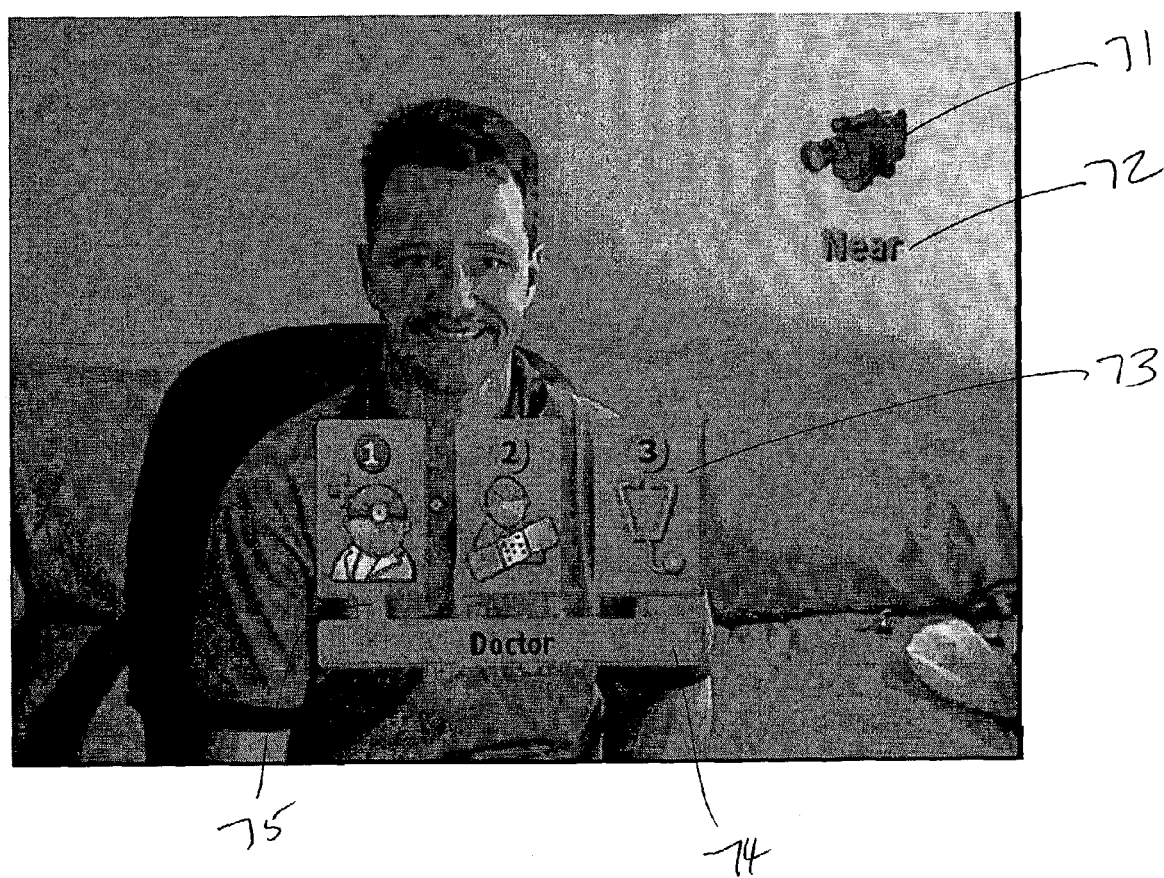
FIG. 8 is an example of a screen seen by the user during a videoconference and showing three, video-source selection icons.

A representative example of a video display is shown in FIG. 8 where icon 71 is used to indicate whether the pan and tilt controls on the remote control will move the camera connected to the videoconference station on the near end or far end of the videoconference. When icon 71 is a camera pointing towards the user, the pan and tilt controls may be used to aim the camera on the near end unit; when icon 71 shifts to a depiction of a camera pointing away from the user, the pan and tilt controls affect the moveable camera on the far end station of the videoconference. Near/far video text label 72 may also be used for this function.

Also shown in FIG. 8 are camera selection icons 73. In the illustrated example, camera 1 is selected (as indicated by the highlighted icon) and the previously associated camera name is displayed in text box 74 which is joined by label connector 75 to (in this case) the "doctor" icon. In certain embodiments, the camera icons and/or video feed labels 72 may automatically be removed from the screen after a pre-selected interval. The time interval may be one of the administrative functions under the "system" tab 8. In some embodiments, video feed label 72 may only be displayed together with label connector 75 when the user's pointing device "rolls over" the particular icon. Alternatively, video feed label 72 and label connector 75 may be displayed by a first instance of user selection while the icon is selected by a second instance of user selection—for example, positioning a cursor on the icon and "clicking" on it would cause the display of video feed label 72 and clicking on the icon a second time would cause the video display to switch to the video feed associated with the icon.

In certain embodiments, the camera selection icons are not shown on the user's display unless and until the user requests them. The request may be made, for example, by pressing the "camera select" button on a wireless remote control. Similarly, the remote control may be equipped with a rocker-type switch to select either "near" or "far" end video signals for display. Alternatively, a single button could be used to toggle between near and far end video feeds with the user relying on near/far camera icon 71 to determine which is currently displayed.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for selecting the video source signal for display during a videoconference comprising:
   presenting a plurality of selectable icons for user selection on a first videoconferencing terminal;
   associating, in response to user selection, an icon with a certain source of video signal to be transmitted by the first videoconferencing terminal;
   sending a plurality of icons each associated with a source of video signal to a second videoconferencing terminal; and,
   switching the video signal transmitted by the first videoconferencing terminal to the second videoconferencing terminal in response to user activation of an icon on the second videoconferencing terminal.

2. A method as recited in claim 1 further comprising presenting a text box for user input of alphanumeric characters;
   associating the alphanumeric characters input by the user with the selected icon.

3. A method as recited in claim 2 wherein the text box is initially displayed with a default string of alphanumeric characters which may be overwritten by the user.

4. A method as recited in claim 1 further comprising grouping the selectable icons into predefined categories.

5. A method as recited in claim 4 wherein at least one of the predefined categories is selected from the group consisting of medical-related icons, legal-related icons, education-related icons, manufacturing-related icons, and corporate-related icons.

6. A method as recited in claim 4 wherein the icon group is selected by the user from a menu of available icon categories.

7. A method as recited in claim 4 wherein a name is associated with each predefined category.

8. A method as recited in claim 7 wherein the name associated with each predefined category is displayed in the language selected by the user from a list of available languages.

9. A method as recited in claim 7 wherein the name associated with each predefined category is displayed in a language associated with the country code of a telephone number input by the user.

10. A method as recited in claim 7 wherein the name associated with each predefined category is displayed in a language associated with the country code of a telephone number selected by the user from a directory of telephone numbers.

11. A method as recited in claim 7 wherein the name associated with each predefined category is displayed in a language associated with the country code of a telephone number selected by the user from a list of recently-called numbers.

12. A method as recited in claim 1 further comprising exchanging user selection of icons between the first videoconferencing terminal and the second videoconferencing terminal.

13. A method for selecting the video source signal for display during a videoconference comprising:
presenting, in response to user input, a plurality of selectable icons for user selection on a first videoconferencing terminal;
associating, in response to user selection, an icon with a certain source of video signal input to the first videoconferencing terminal;
sending the icon to a second videoconferencing terminal;
displaying the selected icons on a video display associated with the second videoconferencing terminal in response to user activation of an input device; and
switching the video signal displayed on the second videoconferencing terminal in response to user activation of a displayed icon associated with a video signal source.

14. A method as recited in claim 13 further comprising selecting near-end or far-end icons for display.

15. A method as recited in claim 14 wherein an input device is used to select the near-end or far-end icons for display.

16. A method as recited in claim 15 wherein the input device is selected from the group consisting of a remote control, a mouse, a trackball, a touch pad, a touch screen, a joy stick and a light pen.

17. A method as recited in claim 13 further comprising displaying, in association with a selected icon, a label comprised of alphanumeric characters.

18. A method as recited in claim 13 further comprising removing the icons from the display in response to user activation of a displayed icon.

19. A method for selecting the video source signal for display during a videoconference comprising:
presenting a plurality of selectable icons on a first videoconferencing terminal;
selecting an icon for association with a certain source of video signal;
sending the icon to a second videoconferencing terminal; and,
activating the icon on the second videoconferencing terminal to cause switching of the video source signal displayed to the video signal source associated with the activated icon.

20. A method as recited in claim 19 further comprising entering a string of alphanumeric characters for association with the source of video signal and
displaying the string of alphanumeric characters upon activation of the selected icon.

21. A processor-based videoconference terminal comprising a medium storing instructions for causing the processor to present a plurality of selectable icons for user selection on a first videoconferencing terminal;
associate, in response to user selection, a first icon with a first source of video signal;
associate, in response to user selection, a second icon with a second source of video signal;
send the first icon and the second icon to a second videoconferencing terminal;
switch the video signal transmitted by the first videoconferencing terminal in response to user activation of an icon on the second videoconferencing terminal.

* * * * *